United States Patent
Watanabe et al.

(10) Patent No.: US 7,336,313 B2
(45) Date of Patent: Feb. 26, 2008

(54) IMAGE SENSING APPARATUS AND SIGNAL PROCESSING APPARATUS

(75) Inventors: Gaku Watanabe, Tokyo (JP); Masayoshi Sekine, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1012 days.

(21) Appl. No.: 10/357,849

(22) Filed: Feb. 4, 2003

(65) Prior Publication Data

US 2003/0175025 A1    Sep. 18, 2003

(30) Foreign Application Priority Data

Feb. 5, 2002  (JP)  ............................ 2002-028572
Jun. 28, 2002  (JP)  ............................ 2002-190550

(51) Int. Cl.
*H04N 5/222*  (2006.01)
(52) U.S. Cl. ..................................... 348/371
(58) Field of Classification Search ................. 348/371
See application file for complete search history.

(56) References Cited

U.S. PATENT DOCUMENTS 5,006,871 A * 4/1991 Noble .......................... 348/64
5,978,022 A * 11/1999 Aoki et al. ................ 348/223.1
6,774,935 B1 * 8/2004 Morimoto et al. ......... 348/211.5

FOREIGN PATENT DOCUMENTS

JP    2000-338567    12/2000

* cited by examiner

*Primary Examiner*—Tuan Ho
*Assistant Examiner*—Dillon Durnford-Geszvain
(74) *Attorney, Agent, or Firm*—Morgan & Finnegan, LLP

(57) ABSTRACT

This invention has as its object to integrate and simplify a communication interface, and to attain a size reduction of a camera housing and a cost reduction. To accomplish this, a digital camera transfers a control signal that controls the operation of at least one strobe device, and an image signal output from an image sensing means via a single USB cable. Upon making an image sensing operation that requires strobe emission of the strobe device, transfer of the image signal is suspended, and a control signal for the strobe device is preferentially transferred.

6 Claims, 11 Drawing Sheets

IMAGE SENSING APPARATUS AND SIGNAL PROCESSING APPARATUS

FIELD OF THE INVENTION

The present invention relates to a control technique of an image sensing apparatus which can be connected to an external computer or an external strobe device.

BACKGROUND OF THE INVENTION

Conventionally, in a camera system to which a digital camera connected with an external strobe, and an image processing computer used to immediately browse sensed image data are connected, the external strobe undergoes light control via a dedicated strobe cable. After images are sensed, sensed image data stored in the digital camera are transferred to the external image processing computer via a data communication means such as USB, IEEE1394, or the like equipped in the main body.

FIG. 10 shows an example of the arrangement of a conventional camera system. In FIG. 10, a digital camera (CAMERA) 1100 has two communication interfaces to which a strobe dedicated bus (XBUS) 1101 and data communication high-speed serial bus (USB) 1107 are connected. An XHUB 1105 is connected to the CAMERA 1100 via the XBUS 1101, and serves to distribute a strobe control signal sent from the CAMERA 1100 to two external strobes (SPEEDLIGHT) 1102 and (SPEEDLIGHT) 1103. When the user of this camera system makes an image sensing operation, the external strobes 1102 and 1103 emit light in synchronism with an exposure function of the CAMERA 1100, thus sensing an image. The sensed image data is sent to an image processing computer (PC) 1106 via the USB 1107, and undergoes an image process. After that, the processed image data is displayed on a display 1104.

A control circuit for the SPEEDLIGHT 1102 receives electric power from a battery pack (BAT) 1108 including four size AA batteries, and also receives electric power required to emit light from a layer-built battery pack (BAT) 1109. Likewise, a control circuit for the SPEEDLIGHT 1103 receives electric power from a battery pack (BAT) 1110, and also receives electric power required to emit light from a layer-built battery pack (BAT) 1111.

On the other hand, in another conventional method, a plurality of still cameras (to be also simply referred to as "cameras" hereinafter) are connected, and an object image is sensed from different directions by these cameras simultaneously or sequentially at given time intervals. In still another image sensing method, using a plurality of strobe emission devices, the shade of an object is controlled to have a required direction and light amount distribution.

In operation control for implementing such image sensing method, since a camera main body has a dedicated terminal used to control the image sensing start timing and strobe emission timing, control via wires of the dedicated terminal or synchronous control using infrared rays or the like is done.

For example, Japanese Laid-Open Patent No. 2000-338567 or the like has proposed a method in which a communication means such as IEEE1394 or the like is arranged in addition to an infrared ray communication means, and time interval information from an infrared ray communication until an actual strobe emission timing is transmitted via that communication means.

FIG. 11 shows the arrangement of an image sensing system 800 described in Japanese Laid-Open Patent No. 2000-338567 or the like.

An image sensing system 800 has an arrangement in which a plurality of strobe emission devices 820-1, 820-2, . . . are connected to a camera 810.

The camera 810 comprises a controller 811, communication unit 812, image sensing unit 813, A/D converter 814, processor 815, recorder 816, timing generator 817, and IR emission unit 818.

The plurality of strobe emission devices 820-1, 820-2, . . . have the same arrangement, i.e., each strobe emission device comprises a controller 821, communication unit 822, strobe emission unit 823, timing generator 824, and IR emission unit 825.

In such image sensing system 800, especially, the camera 810 comprises the communication unit 812 such as IEEE1394, and the IR emission unit 818 serving as an infrared ray emission means, and each strobe emission device 820-x (x: 1, 2, . . . ) comprises the communication unit 822 such as IEEE1394, and the IR emission unit 825 serving as an infrared ray emission means. Before strobe emission, the communication unit 812 of the camera 810 exchanges information that pertains to a time interval (delay time) from when the IR emission unit 818 of the camera 810 emits infrared rays until the strobe emission unit 823 of the strobe emission device 820-x emits light.

However, the aforementioned prior art suffers the following problems. That is, independent communication interfaces and cables must be equipped for external strobe control and data transfer, and connections are complicated. Also, independent dedicated communication terminals must be equipped for respective purposes, and it is difficult to attain a size reduction of the housing size of the camera.

In the strobe, electric power required for emission control and that required to emit light are supplied from independent battery packs. It is a common practice to supply electric power required for emission control mainly from size AA batteries stored in the strobe, and to supply electric power required to emit light from the layer-built battery pack connected to the strobe.

Therefore, connections of the plurality of battery packs are troublesome, and if electric power of the battery pack for control is used up, an image sensing operation is disabled even when the battery pack for light emission can still supply sufficient electric power.

In the conventional image sensing system described in Japanese Laid-Open Patent No. 2000-338567 or the like, a communication using infrared rays (that between the IR emission units 818 and 825) is required in addition to a wired communication (that between the communication units 812 and 822), as shown in FIG. 11. For this reason, it is difficult to attain a cost reduction and size reduction of the apparatus or system. In addition, the following problems remain unsolved. For example, normal light emission is disturbed if infrared rays are intercepted, and a time delay occurs between emission and reception of infrared rays.

SUMMARY OF THE INVENTION

Accordingly, an object of the present invention is to provide a compact camera which can appropriately control peripheral devices.

According to the present invention, the foregoing object is attained by providing an image sensing apparatus comprising:

image sensing means for sensing an image; and signal control means for transferring a control signal used to control an operation of at least one strobe device, and an image signal output from said image sensing means to an external device, wherein the signal control means suspends transfer of the image signal and preferentially transmits a control signal for the strobe device upon making an image sensing operation which requires strobe emission of the strobe device.

According to another aspect of the present invention, the foregoing object is attained by providing a signal processing apparatus which can communicate with at least one slave device via predetermined communication means, and serves as a master which controls the slave device to perform a predetermined operation, comprising:

signal transmission means for transmitting signals to the at least one slave device via the predetermined communication means at given time intervals; and instruction means for instructing the slave device to use the signals transmitted at the given time intervals as timing signals for the predetermined operation.

Other features and advantages of the present invention will be apparent from the following description taken in conjunction with the accompanying drawings, in which like reference characters designate the same or similar parts throughout the figures there.

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
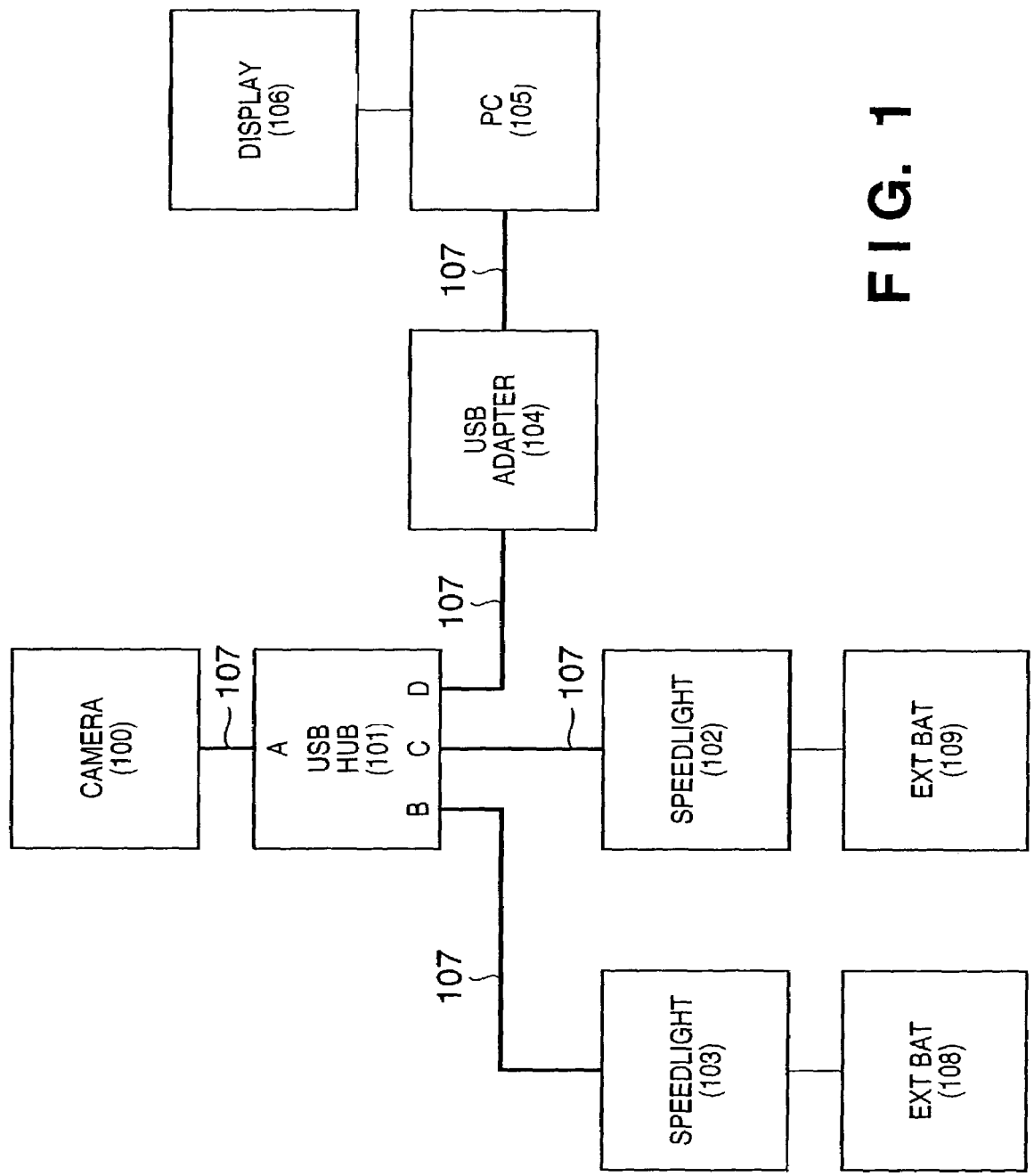
FIG. 1 is a block diagram showing a basic arrangement of a camera system according to the first embodiment of the present invention.

FIG. 1 shows a basic arrangement of a camera system according to the first embodiment of the present invention. In the description of this embodiment, a USB interface is used as a communication interface of this system.

<Basic Operation>

The basic operation of the camera system of this embodiment will be explained first. A digital camera (CAMERA) 100 in FIG. 1 senses an image. A USB interface equipped in the CAMERA 100 is connected to a communication hub (USB HUB) 101 via a USB cable or network 107. The USB HUB 101 distributes communication data received from the CAMERA 100 into three paths. The USB HUB 101 has connection terminals A, B, C, and D. Terminal A is connected to the CAMERA 100; terminal B to a strobe (SPEEDLIGHT) 103; terminal C to a strobe (SPEEDLIGHT) 102; and terminal D to a USB ADAPTER 104.

The CAMERA 100 makes emission control and light control of the SPEEDLIGHTS 102 and 103 using the USB upon sensing an image. The USB ADAPTER 104 is a communication adapter used to connect the USB HUB 101 and an image processing computer (PC) 105. The CAMERA 100 sends sensed image data to the PC 105 via the USB HUB 101 and USB ADAPTER 104. The user of this system confirms a sensed image on a display device (DISPLAY) 106 connected to the PC 105. Note that the USB interface can transmit electric power. Electric power supplied from the CAMERA 100 is distributed by the USB HUB 101, and is supplied to the SPEEDLIGHTS 102 and 103, and the USB ADAPTER 104.

<Image Sensing and Strobe Control>

Strobe emission control of the camera system of this embodiment will be explained below using FIG. 2. In this embodiment, the SPEEDLIGHT 103 is connected to terminal B of the USB HUB 101, as shown in FIG. 1. However, since the operation and internal structure of the SPEEDLIGHT 103 are the same as those of the SPEEDLIGHT 102, an illustration and description of the operation of the SPEEDLIGHT 103 will be omitted.

The CAMERA 100 comprises, as its building components, an image sensing system 10001 including a lens and the like, an image sensing circuit 10002 including an image sensing element, its control circuit, and the like, a development processing circuit 10003 for converting a sensed image signal into a predetermined color signal, and a compression/decompression circuit 10004 for compressing or decompressing an image signal. The sensed image signal is processed by these circuits, and is saved in a memory card 10014, thus digitally sensing an image. As means for displaying the sensed image, a display processing circuit 10005 and display element 10006 are arranged. A CPU 10011 controls these circuits as a whole, and user's instructions are input via an operation switch 10010. The CAMERA 100 also comprises a ROM 10012 that saves programs and data, and a RAM 10013 used as a work area. Furthermore, the CAMERA 100 comprises a USB host controller 10020 as a communication means.

Note that USB is a high-speed communication network which was developed for the primary purpose of controlling peripheral devices from a personal computer, and has prevailed since it can implement high-speed communications with low cost. Many digital cameras which mount USB device controllers have already been released, and such interface is used to control a camera from a personal computer and to fetch sensed image data stored in a camera into a personal computer.

However, USB specifies only one communication master on a network, and a personal computer always serves as this master. Since peripheral devices which form a USB network incorporate only device controllers which merely follow instructions and timings from the communication master, timing control or the like cannot be made from the peripheral device side. The network has a tree pattern, and the communication master is always located at the apex of the tree and communicates with a plurality of peripheral devices via a relay means such as the USB HUB 101 in FIG. 1. Also, different communication connectors are defined for master and slave functions.

The CAMERA 100 as a building component of this camera system comprises the USB host controller 10020 which has a USB communication master function that is conventionally implemented by a personal computer, and communicates with external devices via a USB connector 10023. The CAMERA 100 supplies electric power of a maximum of around 500 mA to connected devices via USB.

The internal arrangement of the SPEEDLIGHT 102 will be described below. The SPEEDLIGHT 102 is connected to the CAMERA 100 via the USB cable 107 and USB HUB 101. The SPEEDLIGHT 102 comprises a connector 10201 which can receive the USB cable 107, a USB device controller 10202, a frame count detection circuit (or frame number comparison circuit) 10203 for detecting the frame count of the USB cable 107, a timing control circuit 10204 for controlling the timing of the strobe device, a CPU 10205 for controlling the overall device, a strobe emission element 10207 such as a xenon lamp or the like, a light control element 10208 for detecting strobe light reflected by an object, and an emission control circuit 10206 that controls emission. The strobe emission element can control the irradiation range, emission color temperature, and the like in accordance with a control signal from the CPU 10205.

The operation of the CPU 10205 is controlled by the CPU 10011 of the CAMERA 100 via the USB cable 107. Therefore, the user of the camera system can freely control the emission functions of the SPEEDLIGHTS 102 and 103. Electric power that the strobe emission element 10207 consumes upon emitting light is supplied from an external battery (EXT BAT) 109. Electric power required for other operations is supplied to a control system power supply circuit 10211 via the USB connector 10201. Hence, no dedicated power supply used to operate a strobe control system is required unlike in the prior art.

At the time of connection of the SPEEDLIGHT 102 to the USB cable 107, the SPEEDLIGHT 102 transfers device specification data such as the model, maximum luminescence intensity (guide number), and the like to the CAMERA 100. The CAMERA 100 can change the light control setup of the SPEEDLIGHTS 102 and 103 to be weaker or stronger than the normal setup via the operation switch 10010. Also, the CAMERA 100 can control the irradiation range. These control data are transmitted via the USB cable 107.

Synchronization of strobe emission will be explained below. The USB host controller 10020 periodically issues a signal named a start-of-frame (to be abbreviated as SOF hereinafter) packet to the USB network 107. The USB network 107 has a feature of transmitting/receiving data which is segmented into time units called frames, and the communication master transmits the SOF packet to indicate the head of that data. According to the USB specification, the SOF packet is sent once per 1 ms. Also, the USB specification defines that when the host controller ceases to output this packet signal for a predetermined period of time, each slave device goes to a sleep state.

When the user has pressed a shutter button included in the operation switch 10010 of the CAMERA 100, the host controller 10020 transmits information which includes a predetermined frame number at which strobe light is to be actually emitted, and a predetermined delay time from reception of that frame number until actual emission, to the strobe emission device.

In the SPEEDLIGHT 102, the device controller 10202 receives these signals, and sets the received predetermined frame number in the frame number comparison circuit 10203. Also, the value of the predetermined delay time from that frame number is set in the timing control circuit 10204. When the predetermined frame number is transmitted in the form of an SOF packet, the circuit 10203 detects that number, and informs the timing control circuit 10204 of it.

The timing control circuit 10204 supplies an emission signal to the emission control circuit 10206 after an elapse of time corresponding to the predetermined delay time, and the strobe emission element 10207 emits light. Strobe emission ends when the emission control circuit 10206 informs the emission element 10207 of the end of emission in accordance with the amount of light received by the light control element 10208.

<Transmission of Sensed Image Data>

Data transfer of the camera system of this embodiment will be described below using FIG. 3. The CPU 10011 of the CAMERA 100 in FIG. 3 outputs image data recorded in the memory card 10014 after image sensing onto the USB network via the USB host controller 10020 and USB connector 10023 in accordance with an operation of a program which is recorded in advance in the ROM 10012. The CPU 10011 always records a transfer operation process in the RAM 10013, and can restart transfer even when transfer is interrupted.

In the USB ADAPTER 104 connected to terminal D of the USB HUB 101, a device controller 10402 receives the image data via its USB connector 10401. The received data is temporarily stored in a memory 10403. A CPU 10405 executes reception control.

An operation power supply circuit 10411 of the USB ADAPTER 104 receives electric power from the USB HUB 101 or PC 105 via the USB cable 107. If no USB cable 107 is connected, the USB ADAPTER 104 cannot operate.

The CPU 10405 issues a data transfer request from a device controller 10406 to a USB host controller 10501 of the image processing computer (PC) 105 via USB connectors 10407 and 10507. After that, the CPU 10405 transfers data to the USB host controller 10501. The data received by the PC 105 is stored in a memory 10503. Furthermore, a CPU 10504 transfers the image data stored in the memory 10503 to a display circuit 10506, and the transferred data is displayed on the display device (DISPLAY) 106.

The USB ADAPTER 104 can receive not only image data but also strobe emission control data and data issued by the SPEEDLIGHTS 102 and 103. These data are transferred to the PC 105 in the same manner as image data. The PC 105 also displays these strobe data on the display device 106 via the display circuit 10506. With this function, the user of the camera system can easily recognize the emission amount, operation, and function of each strobe of the camera system which is currently used.

<Data Transfer Control>

Figure 2:
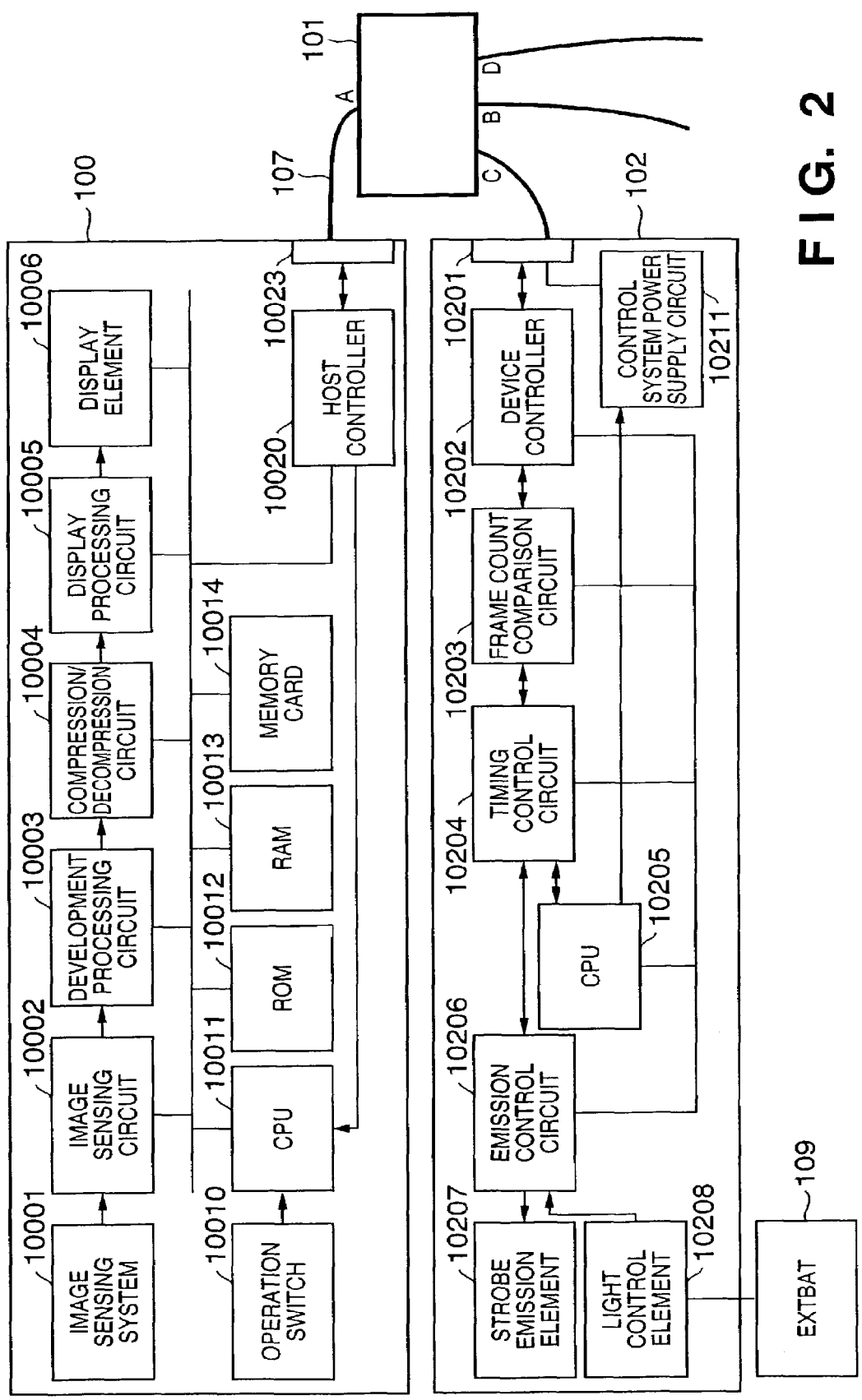
FIG. 2 is a block diagram for explaining strobe emission control of the camera system according to the first embodiment of the present invention.
Figure 3:
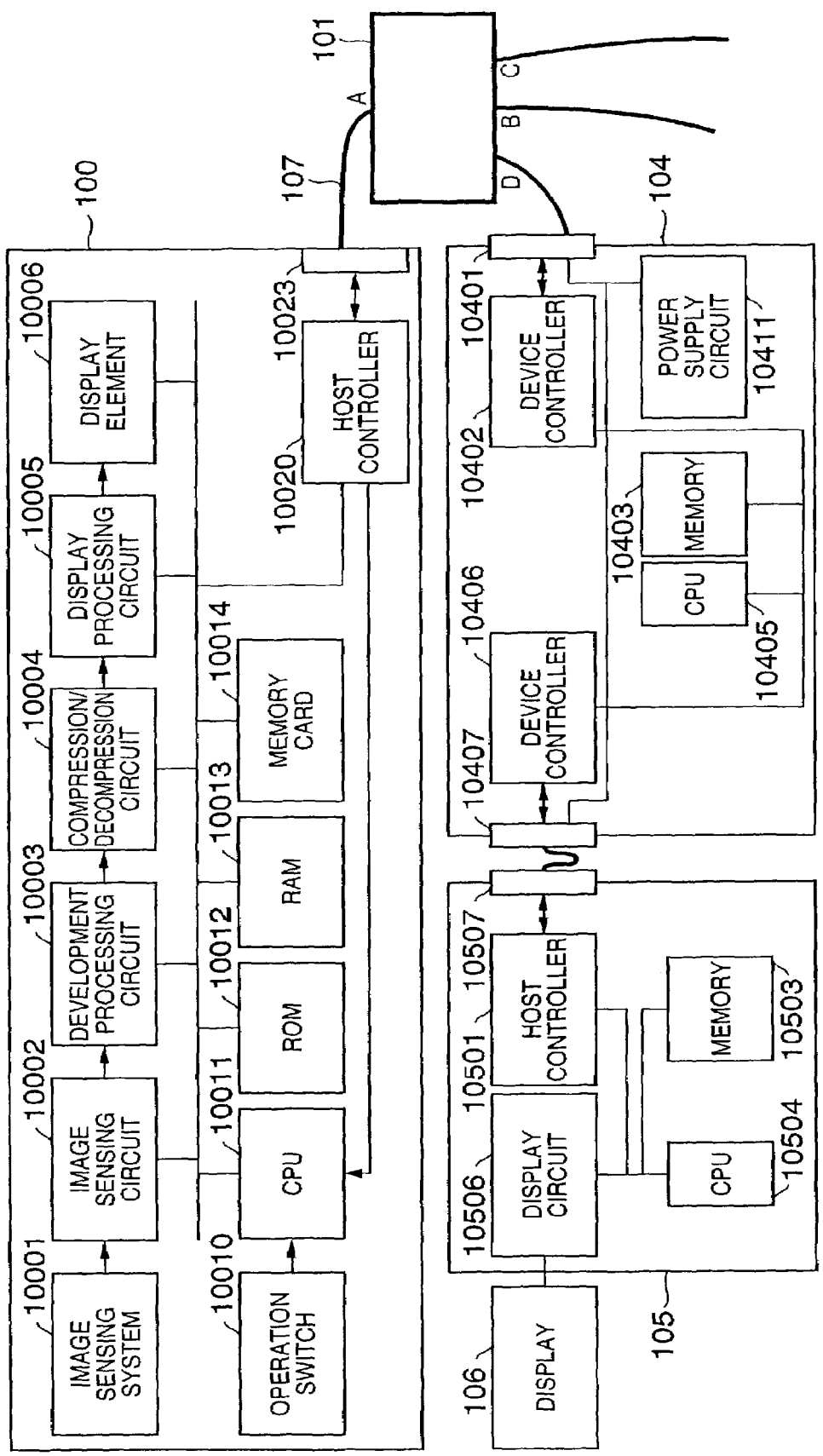
FIG. 3 is a block diagram for explaining data transfer of the camera system according to the first embodiment of the present invention.

As described above, the USB cable that connects the CAMERA 100 and USB HUB 101 in FIG. 2 or 3 transfers the strobe control signal and sensed image data. However, even during transfer of sensed image data, if an image sensing operation that uses the strobes is to be executed, signals associated with strobe control are preferentially transferred. With this operation, even a camera which does not have any communication interface dedicated to a strobe can control an external strobe without imposing any stress or disrupted feeling on the user.

Figure 4:
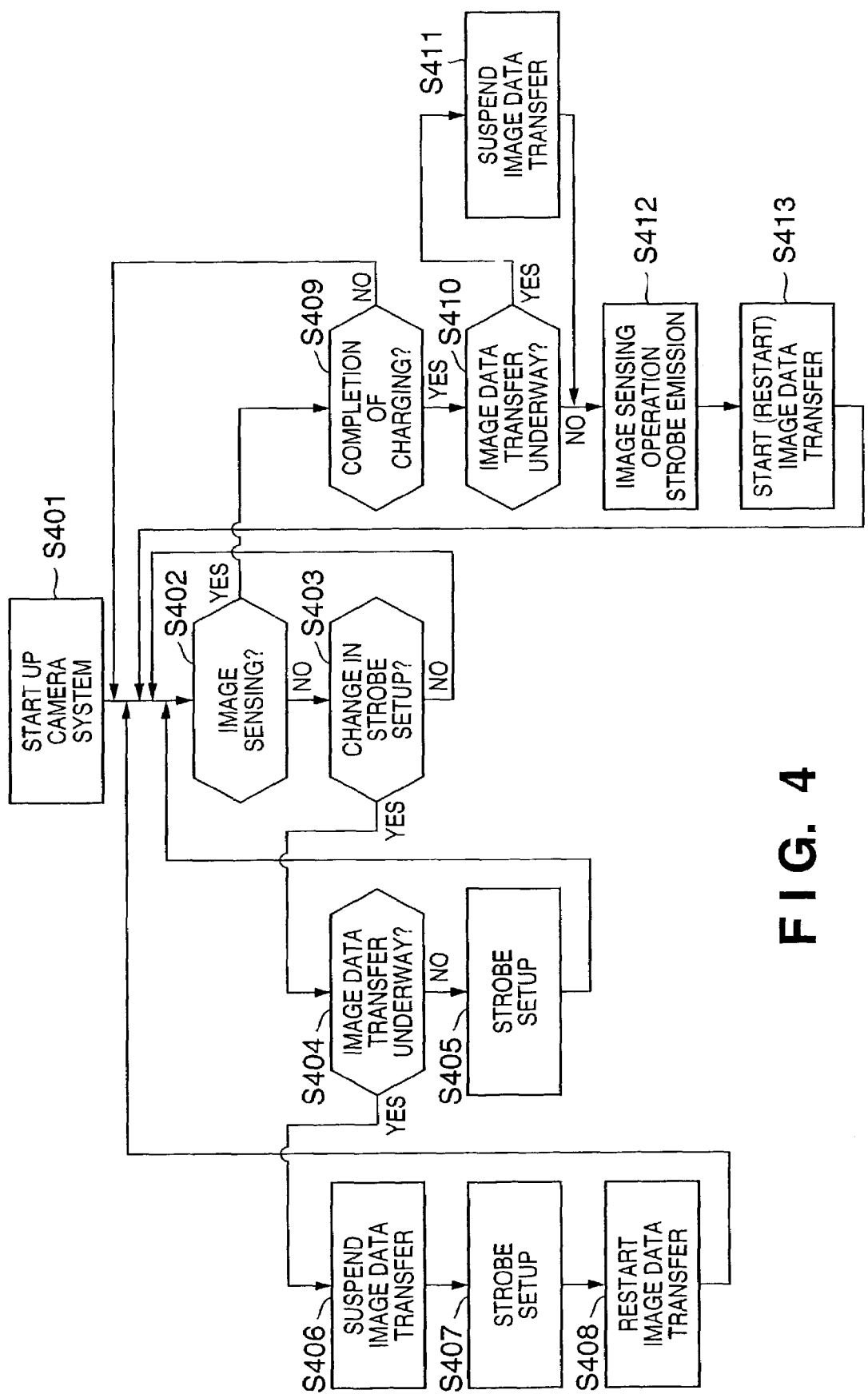
FIG. 4 is a flow chart showing the flow of operations of the camera system according to the first embodiment of the present invention.

FIG. 4 shows the operation of the camera system at this time. Data transfer control in this camera system will be described below with reference to FIGS. 2, 3, and 4. The transfer control to be described below is executed by the CPU 10011 in FIGS. 2 and 3 in accordance with a program which is recorded in advance in the ROM 10012.

The camera system starts up (S401). At this time, the power supplies of all devices which form the camera system in FIG. 1 are turned on. The CPU 10011 checks in step S402 if an image sensing operation is done in accordance with a user's instruction input via the operation switch 10010. If YES in step S402, the flow advances to step S409; otherwise, the flow advances to step S403.

If the flow advances to step S403, and if it is determined in accordance with a user's instruction via the operation switch 10010 that the user of the camera system changes the setup of the SPEEDLIGHT 102 or 103, the CPU 10011 executes step S404; otherwise, it executes step S402.

The CPU 10011 checks in step S404 if transfer of image data is currently underway. Since the CPU 10011 records a transfer operation process in the RAM 10013, this checking step can be implemented by checking that record. If transfer is underway, the CPU 10011 executes step S406; otherwise, it executes step S405.

In step S405, the CPU 10011 communicates with the SPEEDLIGHTS 102 and 103 via the USB HUB 101 in association with the strobe emission amount and irradiation range in accordance with a user's instruction via the operation switch 10010, and sets up the SPEEDLIGHTS 102 and 103 to that of user's choice. After the setup, the CPU 10011 executes step S402.

On the other hand, in step S406 the CPU 10011 interrupts current image data transfer which is underway. The CPU 10011 holds a record that indicates data at an interrupted position of interrupted image data in the RAM 10013. The flow then advances to step S407. In step S407, the CPU 10011 communicates with the SPEEDLIGHTS 102 and 103 via the USB HUB 101 in association with the strobe emission amount and irradiation range in accordance with a user's instruction via the operation switch 10010, and sets up the SPEEDLIGHTS 102 and 103 to that of user's choice. The flow advances to step S408, and the CPU 10011 restarts image transfer using the record held in the RAM 10013 in step S406. After that, the CPU 10011 executes step S402.

If the control advances from step S402 to step S409, the CPU 10011 communicates with the CPU 10205 of the SPEEDLIGHT 102 via USB to confirm if the currently set emission operation can be made. If sufficient electric power is not charged on the light control element 10208, the CPU 10011 executes step S402; otherwise, it executes step S410.

The CPU 10011 checks in step S410 if transfer of image data is currently underway. Since the CPU 10011 records a transfer operation process in the RAM 10013, this checking step can be implemented by checking that record. If transfer is underway, the CPU 10011 executes step S411; otherwise, it executes step S412. In step S411, the CPU 10011 interrupts current image data transfer which is underway. The CPU 10011 holds a record that indicates data at an interrupted position of interrupted image data in the RAM 10013. In step S412, the CPU 10011 executes an operation in accordance the contents that have already been explained in association with image sensing and strobe control.

In step S413, the CPU 10011 starts transfer of image data sensed in step S412. If transfer of previously sensed image data is not complete, the CPU 10011 preferentially transfers that image data.

As can be seen from the above description, in this embodiment, a control signal and image signal are transferred using a single data communication means, a communication of image data is temporarily interrupted upon making an image sensing operation that requires strobe emission, and a data communication required for strobe control is preferentially made. Hence, the image sensing apparatus need only have one communication terminal to transfer a control signal and image signal, thus integrating and simplifying a communication interface, and achieving a size reduction of the image sensing apparatus housing and a cost reduction. Furthermore, the camera user can quickly make required setups upon making an image sensing operation, and can start the image sensing operation without any stress.

In this embodiment, since electric power is supplied to the strobe device via a power supply line as one component of the data communication means, electric power used by the strobe device can be supplementarily supplied from the image sensing apparatus, and the strobe device can be continuously used for a long period of time.

In this embodiment, the image sensing apparatus can control the luminescence intensity, irradiation range, color temperature of an emission source, and inhibition of strobe light emission of the strobe device using a control signal, an object to be sensed can be effectively illuminated and sensed according to user's will.

In this embodiment, since the emission timing of strobe light in the strobe device is controlled by periodically issuing a control signal, the image sensing apparatus need not have any independent means for controlling the emission timing of strobe light, and a size reduction of the image sensing apparatus housing and a cost reduction can be attained.

Since electric power used by the control circuit of the strobe device is very weak, if the strobe device has a dedicated power supply as an accessory, it becomes bulky. By contrast, since this embodiment supplies electric power to the control circuit of the strobe device, a size reduction of the strobe device can be attained.

In this embodiment, since electric power for driving the emission element is not supplied from the image sensing apparatus, electric power is supplied from another power supply to the emission element that requires a large current in place of supplying the whole electric power that the strobe device uses, and the minimum emission interval of the strobe device can be shortened.

Furthermore, in this embodiment, since the data communication means adopts USB, components and software of a versatile computer can be commonly used, and the manufacturing cost can be reduced.

Second Embodiment

An image sensing system 1000 according to the second embodiment of the present invention will be described using FIG. 5.

An image sensing system 1000 of this embodiment includes a digital camera 200 and a plurality of strobe emission devices 300-1 and 300-2. Especially, this system adopts an arrangement that makes information communications and timing control between the digital camera 200 and the plurality of strobe emission devices 300-1 and 300-2 via network communications such as USB or the like.

The arrangement and operation of the image sensing system 1000 of this embodiment will be described in detail below.

Figure 5:
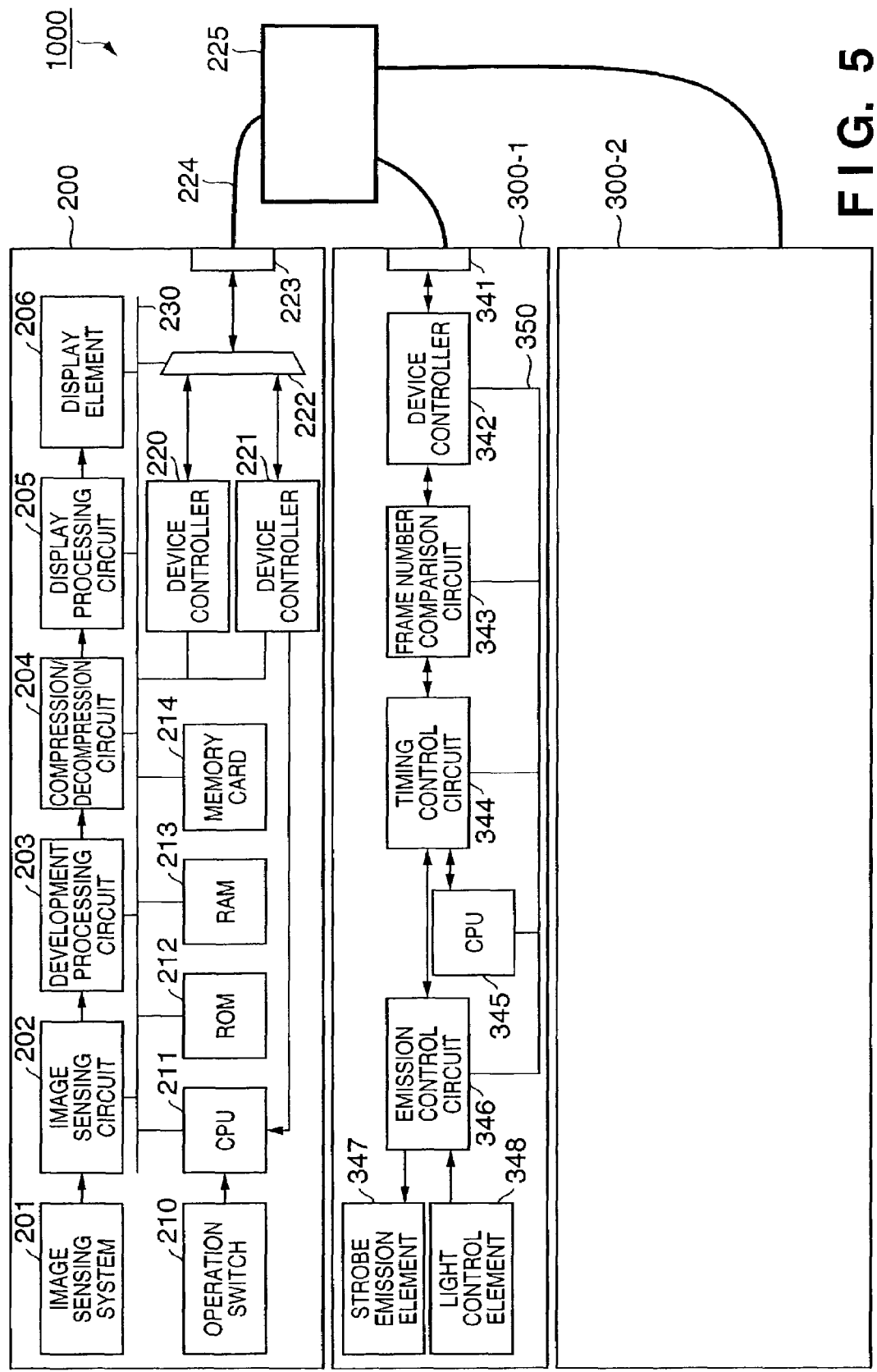
FIG. 5 is a block diagram showing the arrangement of an image sensing system according to the second embodiment of the present invention.

In FIG. 5, the two strobe emission devices 300-1 and 300-2 are connected to one digital camera 200. However, the present invention is not limited to such numbers of components, and three or more strobe emission devices 300-1, 300-2, . . . may be connected to one digital camera 200.

Since the plurality of strobe emission devices 300-1, 300-2, . . . have the same arrangement, a description may be given focusing attention on an arbitrary strobe emission device 300-x.

In this embodiment, the digital camera 200 controls the plurality of strobe emission devices 300-1, 300-2, . . . .

<Arrangement of Digital Camera 200>

The digital camera 200 adopts an arrangement in which an image sensing circuit 202 to which an image sensing system 201 is connected, a developing processing circuit 203, a compression/decompression circuit 204, a display processing circuit 205, a display element 206, a CPU 211 to which an operation switch 210 is connected, a ROM 212, a RAM 213, a memory card 214, a USB device controller 220, a USB host controller 211, and a switch unit 222 are connected via a system bus 230 to be able to communicate with each other, as shown in FIG. 5.

The image sensing circuit 202 receives an object optical image from the image sensing system 201 such as a lens and the like, and outputs a sensed image signal (image signal). The circuit 202 includes an image sensing element, its control circuit, and the like.

The development processing circuit 203 converts an image signal from the image sensing circuit 202 into a predetermined color signal.

The compression/decompression circuit 204 compresses or decompresses an image signal.

Therefore, an image signal processed by the image sensing circuit 202, development processing circuit 203, and the like is compressed by the compression/decompression circuit 204, and the compressed image signal is saved in the memory card 214. In this way, the memory card 214 digitally saves sensed images.

The display processing circuit 205 displays the image signal processed by the image sensing circuit 202, development processing circuit 203, and the like on the display element 206.

The CPU 211 controls the operation of the overall digital camera 200 by, e.g., executing a predetermined processing program stored in the ROM 212 or the like in accordance with a user's operation at the operation switch 210.

The ROM 212 stores various programs and data, and the RAM 213 is used as, e.g., a work area.

The USB device controller 220 and USB host controller 221 make communication control with the plurality of strobe emission devices 300-1, 300-2, . . . via a USB cable 224 and hub 225 connected to a connector 223.

The digital camera 200 of this embodiment has both communication master and slave functions provided by the USB host controller 221 which has the USB communication master function which is normally implemented by a personal computer, and the USB device controller having the communication slave function, as shown in FIG. 5. Furthermore, the digital camera 200 comprises the switch unit 222 that switches communication lines of these controllers, and the connector 223 which is compatible to both the USB host controller 221 and USB device controller 220.

The USB device controller 220 is used when a communication partner is a USB host device such as a personal computer or the like. More specifically, for example, the USB device controller 220 is used when an image file saved in the memory card 214 is transferred to the personal computer at high speed, or when the operation mode or the like of the digital camera is set by the personal computer.

<Arrangement of Strobe Emission Device 300-x>

The plurality of strobe emission devices 300-1, 300-2, . . . have the same arrangement, and are connected to the digital camera 200 via USB cables 224 and the hub 225.

Focusing attention on the strobe emission device 300-1 of the plurality of strobe emission devices 300-1, 300-2, . . . , the strobe emission device 300-1 has an arrangement in which a connector 341, USB device controller 342, frame number detection (comparison) circuit 343, timing control circuit 344, CPU 345, and emission control circuit 346 to which a strobe emission element 347 and light control element 348 are connected are connected via a system bus 350 to be able to communicate with each other, as shown in FIG. 5.

The connector 341 can receive a USB cable.

The frame number detection circuit 343 detects the USB frame number.

The timing control circuit 344 controls the timing of the strobe emission device 300-1.

The strobe emission element 347 is a light-emitting element such as a xenon lamp or the like, and the light control element 348 detects strobe light reflected by an object.

The emission control circuit 346 controls the strobe emission element 347 and light control element 348.

<Operation of Digital Camera 200 and Strobe Emission Device 300-x>

At the time of connection of the cable 224 to the digital camera 200 or at the time of connection of the hub 225 to the cable 224, the digital camera 200 checks using its CPU 211 if the USB host controller 221 or device controller 220 is to be used.

As this checking method, a method of checking the type of the cable 224 connected to the connector 223, and the state of its electrodes, a checking method based on a manual instruction, i.e., a method of prompting the user to select a mode on a menu window, and the like may be used.

In this case, since the strobe emission device 300-x has the USB device controller 342 alone, the digital camera 200 determines use of the USB host controller 221, and sets this determination information in the switch unit 222.

At the time of connection of the strobe emission device 300-x to the USB network formed by the hub 225 and cable 224, the strobe emission device 300-x transmits device specification information such as the model of the-strobe emission device 300-x, luminescence intensity (guide number), and the like to the digital camera 200, and the digital camera 200 sets, e.g., a unique address (strobe unique address) and the like in the strobe emission device 300-x.

At a timing before the beginning of an image sensing operation of the digital camera 200, e.g., when a shutter button included in the operation switch 210 of the digital camera 200 is pressed (to the second stroke position), the digital camera 200 transmits information (emission parameters) such as a strobe emission amount, light diffusion angle, and the like to the strobe emission device 300-x.

The synchronization relationship of strobe emission among the plurality of strobe emission devices 300-1, 300-2, . . . will be explained below.

In the digital camera 200, the USB host controller 221 periodically issues an "SOF" packet onto the USB network formed by the hub 225 and cable 224.

Figure 6:
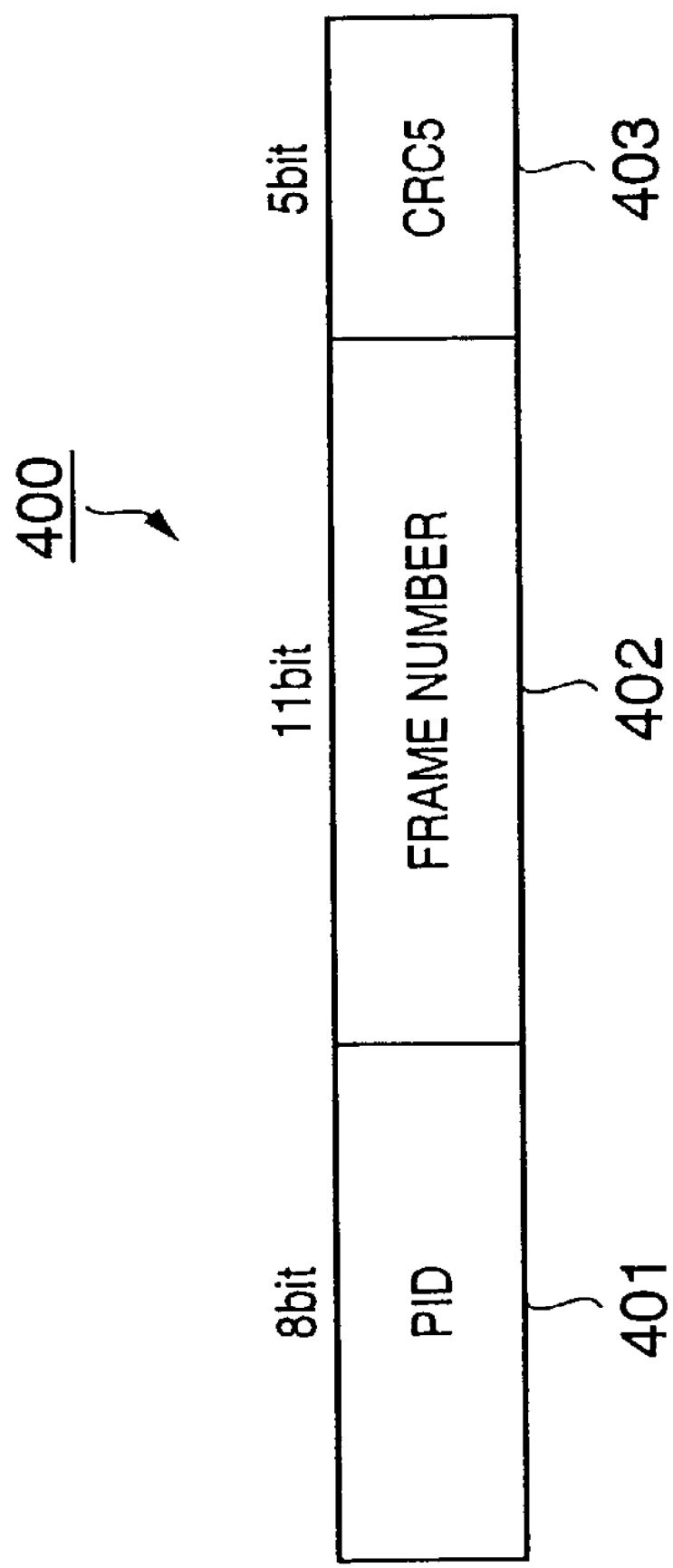
FIG. 6 is a view for explaining a start-of-frame packet used in a communication in the image sensing system according to the second embodiment of the present invention.

FIG. 6 shows an SOF packet 400.

The SOF packet 400 includes PID 401, frame number 402, and CRC 403, as shown in FIG. 6.

The PID 401 is 8-bit data, which indicates an identification number that specifies that this data is an SOF packet.

The frame number 402 indicates a frame number consisting of 11 bits, i.e., number information that returns to a previous value for 2048 ms.

The CRC 403 is 5-bit data used to confirm if data can be correctly received.

As can be seen from FIG. 6, the SOF packet 400 has no concept of "address". Hence, all devices connected to the USB network simultaneously refer to an identical signal.

Thus, when the shutter button included in the operation switch 210 of the digital camera 200 is pressed, the USB host controller 221 transmits information which includes a predetermined frame number at which strobe light is to be actually emitted, and a predetermined delay time from reception of that frame number until actual emission, to the strobe emission device 300-x.

In the strobe emission device 300-x, power supply monitor and a strobe emission operation to be described below are executed under the control of the CPU 345.

That is, the USB device controller 342 receives the information transmitted from the digital camera 200, sets the predetermined frame number included in that information in the frame number comparison circuit 343, and also sets the delay time information (the value of the predetermined delay time from that frame number) included in that information in the timing control circuit 344.

When a predetermined frame number is transmitted in the form of an SOF packet, the frame number comparison circuit 343 detects that frame number, and informs the timing control circuit 344 of it.

The timing control circuit 344 gives an emission signal to the emission control circuit 346 after an elapse of the predetermined delay time based on information from the frame number comparison circuit 343.

The emission control circuit 346 controls the strobe emission element 347 to emit light on the basis of the emission signal from the timing control circuit 344.

Strobe emission ends when the emission control circuit 346 informs the strobe emission element 347 of the end of emission in accordance with the amount of light received by the light control element 348.

The emission timing of the strobe emission device 300-x is defined by a timing value obtained in advance by the digital camera 200 side so that strobe light is emitted after a shutter open state of the digital camera 200 is obtained.

With the operation control using the frame number, the strobe emission device 300-x accurately emits strobe light at the time designated by the digital camera 200 itself.

That is, each of the plurality of strobe emission devices 300-1, 300-2, . . . can achieve similar strobe emission.

Since unique addresses are assigned to the respective strobe emission devices 300-1, 300-2, . . . , different emission amounts and delay times from SOF packets can be designated. In such case, the corresponding information (command) can be transmitted after the unique address of each device is designated. In this case, a control transfer mode or the like defined as the USB transfer mode is used. However, since an SOF packet is assigned no address, it is processed at the same timing in the respective strobe emission devices 300-1, 300-2, . . . . That is, when an identical frame number of strobe emission is set in the respective strobe emission devices 300-1, 300-2, . . . , the strobe emission devices 300-1, 300-2, . . . simultaneously emit light since they respond to the identical frame number.

<Operation of Image Sensing System 1000>

Figure 7:
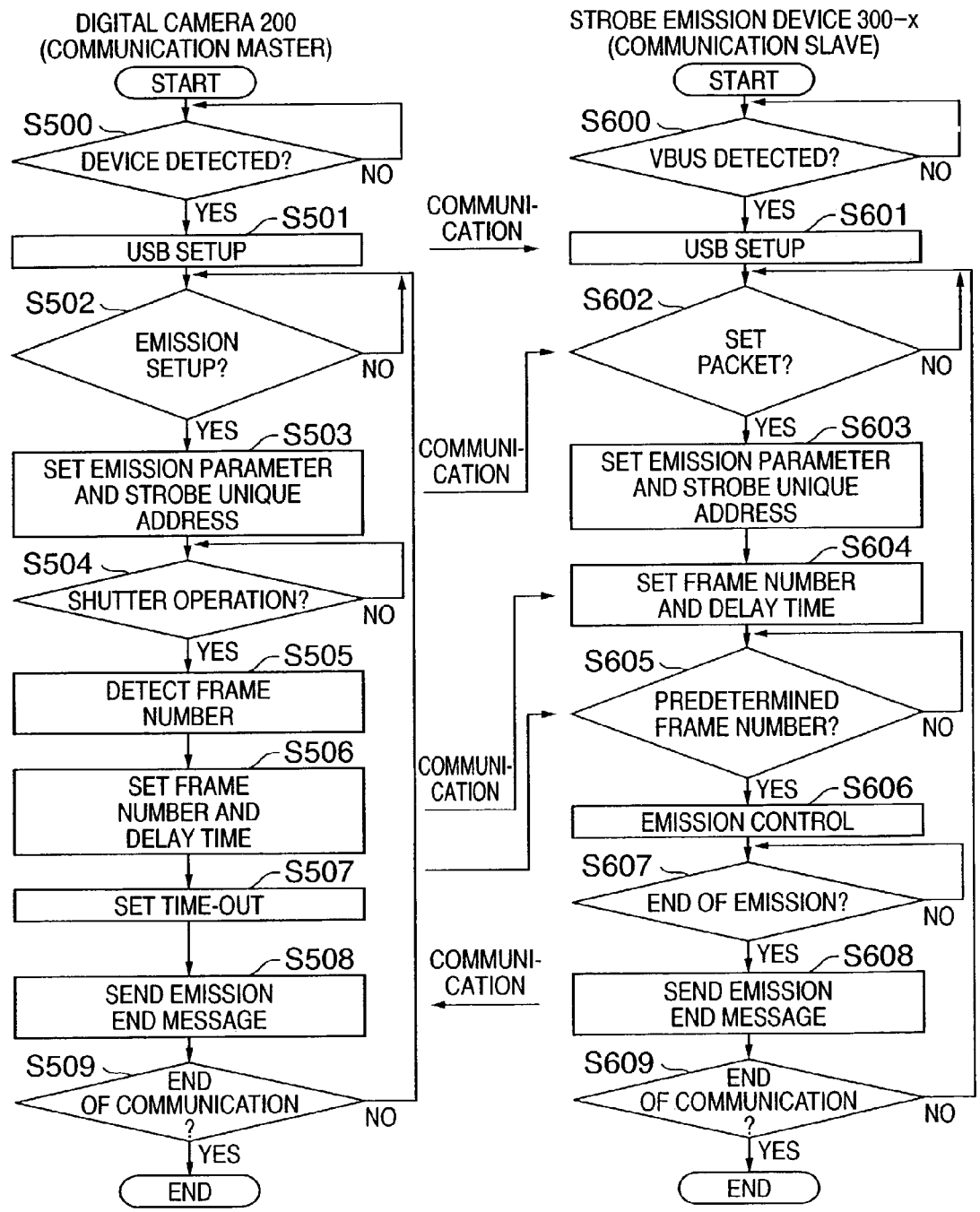
FIG. 7 is a flow chart for explaining the operation of the image sensing system according to the second embodiment of the present invention.

FIG. 7 is a flow chart showing the operations of the digital camera 200 (communication master function side) and strobe emission device 300-x (communication slave function side) shown in FIG. 5 as well as communication contents between them.

Step S600:

The strobe emission device 300-x monitors a VBUS potential of USB, and recognizes upon detection of power supply that the strobe emission device 300-x is connected to an arbitrary communication master (digital camera 200 in this case) via the USB connector 341 and cable 224. The strobe emission device 300-x pulls up a D+ or D− signal line via a resistor by rule on the basis of the above recognition in accordance with an allowable communication rate, and the flow then advances to step S601.

Step S500:

The digital camera 200 detects connection of a communication slave (strobe emission device 300-x in this case) to the USB network, and its allowable communication rate as a result of the above pull-up process, and the flow advances to step S501.

Step S601, Step S501:

The digital camera 200 as a communication master makes setups of, e.g., a USB address and the like, which are specified by the protocol, for the strobe emission device 300-x.

The operations executed so far are the same as those specified by USB and done in conventional devices.

Step S502, Step S503:

The digital camera 200 checks if the setup that pertains to emission has been made manually or automatically (step S502). As a result of this checking process, if it is determined that the emission setup has been made, the digital camera 200 makes the emission setup (e.g., the setup of a unique address and the like of the strobe emission device 300-x) by sending the aforementioned SOF packet to the strobe emission device 300-x (step S503).

Step S602, Step S603:

Upon detection of the SOF packet sent from the digital camera 200 (step S602), the strobe emission device 300-x makes an emission setup according to that SOF packet (step S603).

Step S504, Step S505:

Upon detection of shutter release (shutter operation) by the user or using a self timer (step S504), the digital camera 200 detects the number of a frame which is output at that time (step S505).

Step S506:

The digital camera 200 determines a delay time on the basis of the frame number detected in step S505, i.e., determines a predetermined frame number at which strobe light is to be actually emitted, and a predetermined delay time from reception of that frame number until actual emission, and sends that information to the strobe emission device 300-x.

Step S604:

The strobe emission device 300-x sets the predetermined frame number and the predetermined delay time from reception of that frame number until actual emission, which are received from the digital camera 200.

Note that information is exchanged between the digital camera 200 and strobe emission device 300-x by communicating SOF packets. The SOF packets are output from the communication master (digital camera 200) once per 1 ms (not shown in FIG. 7), and this output process is periodically and automatically executed.

The digital camera 200 keeps monitoring the frame number, and sends that frame number to the strobe emission device 300-x.

Step S605:

The strobe emission device 300-x checks based on the frame number sent from the digital camera 200 if the frame number set in step S604 has been reached. As a result of this checking process, if it is determined that the set frame number has been reached, the flow advances to step S606.

Step S606:

The strobe emission device 300-x executes emission control after an elapse of the predetermined delay time set in step S604 from the reception timing of the frame number set in step S605 from the digital camera 200.

Step S607:

The end timing of emission in step S606 is directly determined between the light control element 348 and emission control circuit 346 under the control of the CPU 345 in the strobe emission device 300-x.

For example, upon reception of a signal indicating the end of emission in the form of, e.g., an interrupt signal, the CPU 345 instructs the emission control circuit 346 to end emission in the light control element 348.

Step S608:

If the strobe emission device 300-x detects the emission end signal in step S607, and actually ends the emission operation, it sends a message indicating the end of emission to the digital camera 200.

At this time, since the communication slave (strobe emission device 300-x) cannot start a communication according to USB, the strobe emission device 300-x sends the emission end message to the digital camera 200 using interrupt transfer or the like.

Step S507, Step S508:

The digital camera 200 sets a time-out time (step S507), and waits for the emission end message sent from the strobe emission device 300-x during that time. Upon reception of the message, or if a time out is reached although the message is not received (step S508), the flow advances to step S509.

The reason why the digital camera 200 sets the time-out time is that if the strobe emission device 300-x cannot send any emission end message due to any emission abnormality, communication error, or the like, the digital camera 200 cannot make other operations during that interval.

The time-out time is set on the basis of, e.g., the difference between the frame number detected in step S505 and the frame number set in step S506 by the digital camera 200, the delay time setup value, a value determined in consideration of the overhead and margin required for a communication, and the like.

Step S509:

Upon completion of emission by the strobe emission device 300-x, the flow returns to step S502, and the digital camera 200 waits for a setup that pertains to the next emission.

Step S609:

Upon completion of emission, the flow returns to step S602, and the strobe emission device 300-x waits for a setup that pertains to the next emission.

As described above, according to this embodiment, the digital camera 200 that autonomously controls the image sensing timing itself implements the master function that makes timing control of a peripheral device when that peripheral device is connected to a network (USB network). Hence, a plurality of devices connected to the digital camera 200 can simultaneously undergo timing management with high precision.

The conventional USB communications made in personal computers and the like have no concept of strict management of the timings of a plurality of devices. However, this embodiment can strictly manage the timings of a plurality of devices by designating a predetermined frame number of an SOF packet.

Also, the USB connector 223 provided to the digital camera 200 can be used to transfer data to a personal computer or the like, which can only implement the USB master function, by switching the connection of the cable 224. In this case, since the digital camera 200 need not autonomously control the timings with respect to the USB network, it implements a slave function in accordance with the USB connection rules.

If the digital camera 200 that autonomously makes an image sensing operation serves as a communication slave function on the USB network, it may send shutter release information to the host controller 221 via control or interrupt transfer, and a communication master function may re-designate the image sensing timing. In this case, a long delay time is unwantedly generated from shutter release until an actual image sensing operation or strobe emission. In this embodiment, in case of the connection relationship in which the digital camera must autonomously control the timings, the digital camera has a master function with respect to the USB network; otherwise, it has a slave function.

Therefore, according to this embodiment, in the digital camera 200, since a connector to which a peripheral device is connected can be commonly used as that for transferring data to, e.g., a personal computer, the apparatus can be made compact. Compared to the prior art, since the need for providing another communication means such as infrared rays in addition to the USB network that makes the setups can be obviated, cost and size reductions can be easily attained, and any unstable operations due to intercepted infrared rays can be avoided.

In this embodiment, as the method of designating a predetermined frame number, for example, a designation method using a 11-bit frame number, a designation method using a difference from the current number value, and the like may be applied.

Also, assume that the host controller 221 and CPU 211 have a line used to inform a frame number so as to cope with a case wherein the frame number of an SOF packet which is currently issued by the host controller 221 must be detected in the digital camera 200. Furthermore, in case of an emission mode that starts emission prior to a shutter open state like an emission mode called a high-speed synchro mode, a frame number and delay information according to that time difference are sent.

In this embodiment, for example, a signal processing apparatus, which can communicate with a plurality of devices (another image sensing apparatus, strobe emission devices, and the like) via a predetermined communication means (means complying with the USB standard or the like)

and executes an autonomous operation in one image sensing operation by collaboration of the plurality of devices, issues timing information for operation control such as an image sensing operation or the like via the predetermined communication means, thus implementing communications and timing control using one predetermined communication means. In this way, the image sensing operation or the like can be precisely made, and cost and size reductions of the apparatus or system can be attained.

More specifically, when this embodiment is applied to a digital camera which can be connected to a network that has a mechanism for simultaneously issuing timing information to a plurality of devices connected to the network, the digital camera that makes an autonomous operation of image sensing control serves as a communication master function that issues timing information to the devices connected to the network. With this arrangement, the devices connected to the network can be controlled at an accurate timing while minimizing a delay time. Also, data transfer and timing control can be made using an identical cable and connector. Also, since another communication means such as infrared rays or the like is not required, size and cost reductions of the apparatus can be attained, and any unstable operations due to intercepted infrared rays can be avoided.

If a network that complies with the USB standard is used or if the digital camera incorporates a host controller that complies with the USB standard, components and software that have been distributed as those for personal computers and the like can be commonly used, thus suppressing the development cost and manufacturing cost. Also, devices such as a printer, modem, and the like are connected to the network, and can be controlled by the digital camera in a single environment.

In the network, if timing information is issued using frame number information contained in an SOF packet in the USB standard, accurate timing control can be done at short cycles.

If the digital camera (communication master) sends in advance frame number information of an SOF packet, delay information from reception of that packet, and information that pertains to the operation sequence to a device on the network, control which is more precise than the cycle of the SOF packet can be processed in a communication slave.

Third Embodiment

An image sensing system according to the third embodiment of the present invention will be described below.

Figure 8:
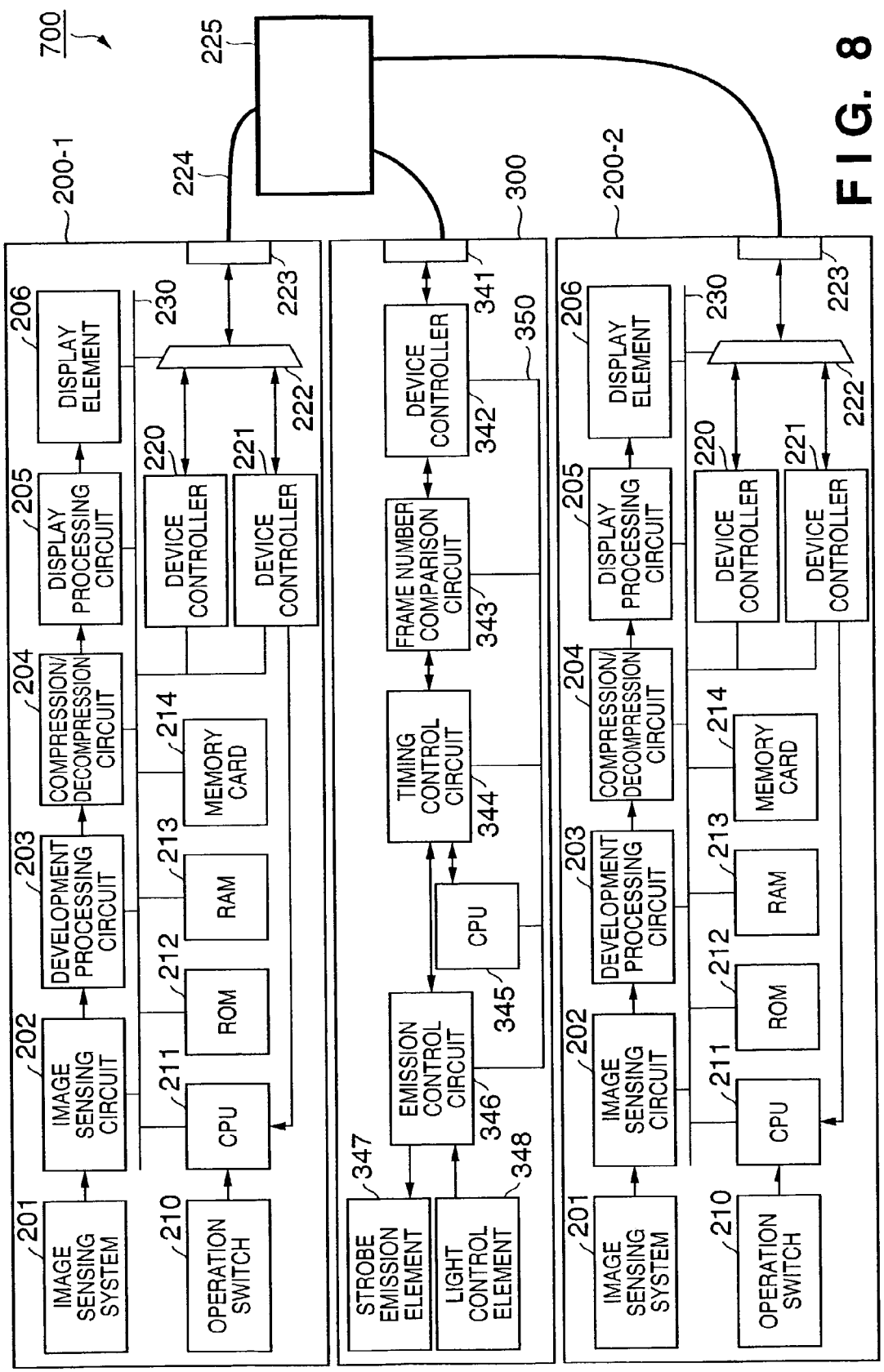
FIG. 8 is a block diagram showing the arrangement of an image sensing system according to the third embodiment of the present invention.

In the second embodiment, one digital camera 200 and a plurality of strobe emission devices 300-x are connected via a network. As shown in FIG. 8, however, an image sensing system 700 of this embodiment connects a plurality of digital cameras 200-1, 200-2, . . . , and one strobe emission device 300 via a network.

The arrangement and operation of the image sensing system 700 of this embodiment will be described in detail below.

Note that the same reference numerals in the image sensing system 700 of FIG. 8 denote components having the same functions as those in the image sensing system 1000 in FIG. 5, and a detailed description thereof will be omitted.

Also, two digital cameras 200-1 and 200-2 are used as the plurality of digital cameras 200-1, 200-2, . . . for the sake of simplicity. However, the present invention is not limited to such specific number of cameras, and three or more digital cameras may be connected.

<Arrangement of Image Sensing System 700>

In this image sensing system 700, the plurality of digital cameras 200-1 and 200-2 are connected to a network, and one digital camera 200-x (digital camera 200-1 in this case) of these cameras issues an image sensing instruction so as to execute image sensing operations from a plurality of directions at the same time or at different timings on purpose.

Such image sensing method using a plurality of cameras is used, e.g., when three-dimensional information is to be acquired in a studio or when a photo is to be taken at the crucial moment.

The digital cameras 200-1 and 200-2 have the same arrangement as that of the digital camera 200 shown in FIG. 5, and the strobe emission device 300 also has the same arrangement as that of the strobe emission device 300-x shown in FIG. 5.

More specifically, in this embodiment, the plurality of digital cameras 200-1 and 200-2 which have the same internal arrangement as that of the digital camera 200 shown in FIG. 5 are connected to the network, and only one strobe emission device 300 which has the same arrangement as that of the strobe emission device 300-x shown in FIG. 5 is connected to the network.

For example, the digital camera 200-1 is a camera that autonomously makes an image sensing operation, and the user who issues an image sensing instruction operates the operation switch 210 of the digital camera 200-1.

The digital camera 200-1 serves as a communication master function side on the USB network, and transmits SOF packets via the USB host controller 221.

Whether or not the digital camera 200-1 serves as the communication master function side is determined by the cable 224 connected and the characteristics of its electrodes, a manual setup using a menu, or the like, as has been explained in the first embodiment.

On the other hand, the digital camera 200-2 serves as a communication slave function side, and uses the USB device controller 220 in case of a communication via the USB network. This controller is also selected by the cable 224 connected and the characteristics of its electrodes, a manual setup using a menu, or the like, as in determination of the communication master function side.

Upon starting an image sensing operation, the digital camera 200-1 transmits a frame number at which light is to be emitted, a delay time from that frame number, and an emission amount to the strobe emission device 300 in advance.

The digital camera 200-2 is assigned a unique address different from that of the strobe emission device 300. The digital camera 200-1 transmits information required for the image sensing operation such as an aperture value, shutter speed, image sensing sensitivity, the number of pixels, a compression ratio, and an image sensing interval in case of a continuous shot mode to the digital camera 200-2 in advance.

Immediately before the beginning of an actual image sensing operation, for example, at the instance of depression of a shutter button included in the operation switch 210 (at the instance of depression to the second stroke position of the shutter button) in the digital camera 200-1, the digital camera 200-1 transmits information indicating the frame number of an SOF packet indicating the image sensing timing, and a delay time from that frame number to the strobe emission device 300 and digital camera 200-2.

With this information, both the digital cameras 200-1 and 200-2 open their shutters in synchronism with the identical frame number, the strobe emission device 300 emits light in a given amount immediately after the shutters are opened, and both the digital cameras 200-1 and 200-2 close their shutters at the same time.

Even when three or more digital cameras are connected to the USB network, the respective digital cameras sense images at the same timing or in accordance with delay time information, if such information is set.

<Operation of Image Sensing System 700>

Figure 9:
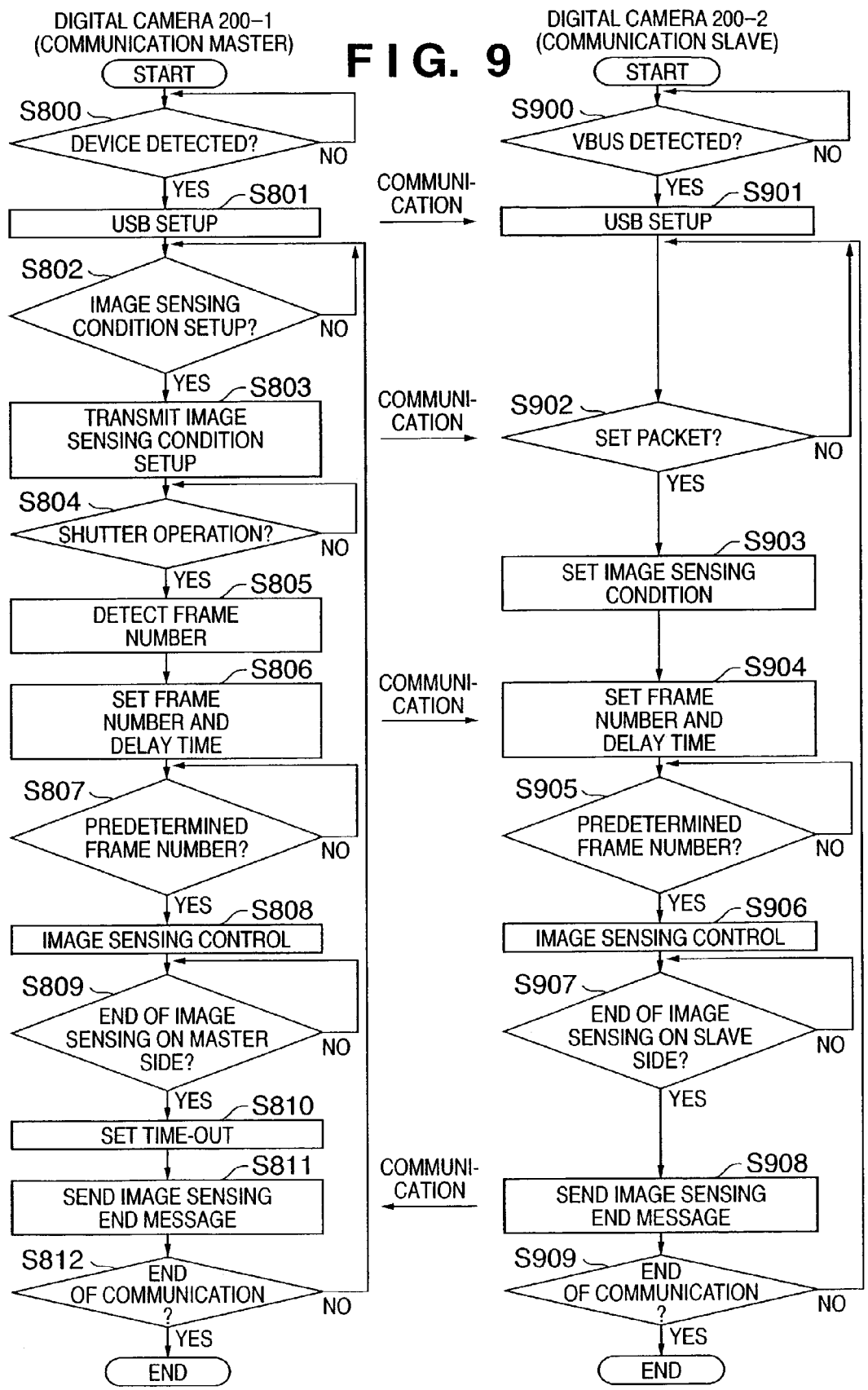
FIG. 9 is a flow chart for explaining the operation of the image sensing system according to the third embodiment of the present invention.
Figure 10:
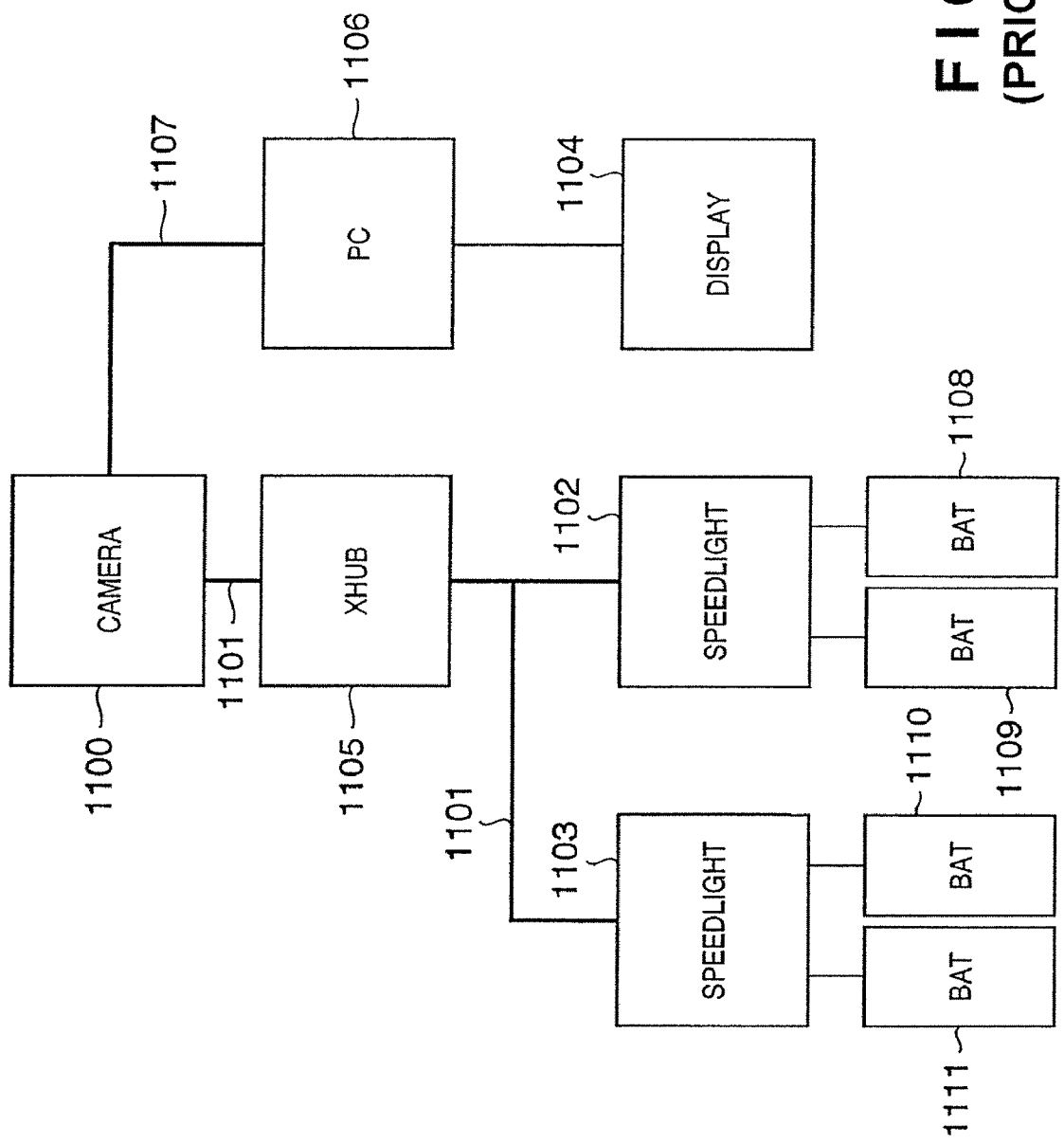
FIG. 10 is a block diagram showing an example of the arrangement of a conventional camera system.
Figure 11:
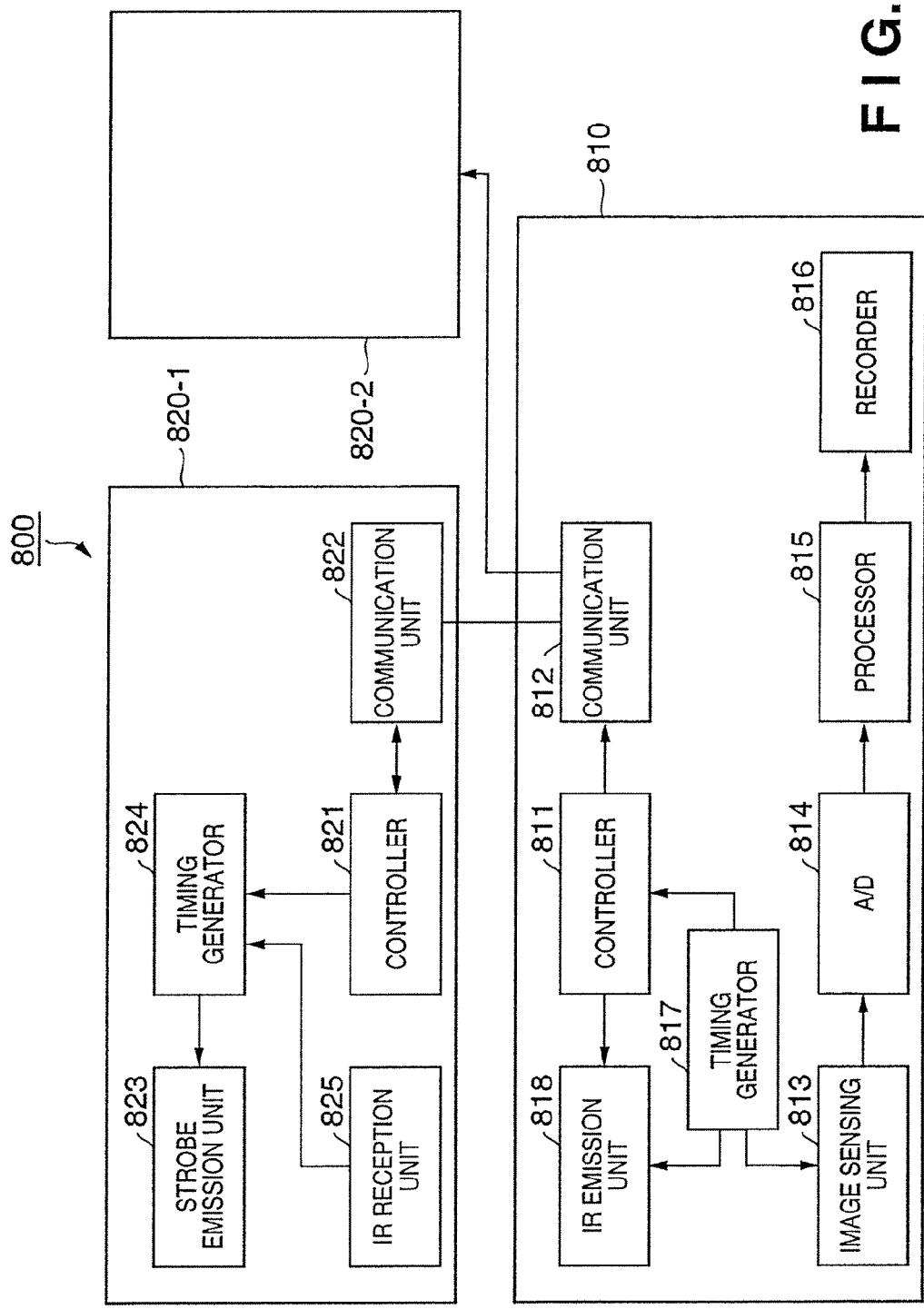
FIG. 11 is a block diagram showing the arrangement of a conventional image sensing system.

FIG. 9 is a flow chart showing the operations of the digital camera 200-1 (communication master function side) and digital camera 200-2 (communication slave function side) shown in FIG. 8 as well as communication contents between them.

Step S900:

The digital camera 200-2 monitors a VBUS potential of USB, and recognizes upon detection of power supply that the digital camera 200-2 is connected to an arbitrary communication master (digital camera 200-1 in this case) via the USB connector 223 and cable 224. The digital camera 200-2 pulls up a D+ or D− signal line via a resistor by rule on the basis of the above recognition in accordance with an allowable communication rate, and the flow then advances to step S901.

Step S800:

The digital camera 200-1 detects connection of a communication slave (digital camera 200-2 in this case) to the USB network, and its allowable communication rate as a result of the above pull-up process, and the flow advances to step S801.

Step S901, Step S801:

The digital camera 200-1 as a communication master makes setups of, e.g., a USB address and the like, which are specified by the protocol, for the digital camera 200-2.

The operations executed so far are the same as those specified by USB and done in conventional devices.

Step S802:

The digital camera 200-1 checks if the image sensing condition setup has been made.

Note that image sensing condition setup is to set up image sensing conditions of the camera such as the shutter speed, aperture value, sensitivity, auto-focus mode, and the like using a menu and button operations or automatically. For example, in the digital camera 200-1, the shutter switch included in the operation switch 210 has two stroke positions, and image sensing conditions are automatically set upon depression of the shutter switch to its first stroke position.

Step S803:

If the digital camera 200-1 recognizes in step S802 that the image sensing conditions have been set, it transmits the setup contents (values set upon depression of the shutter switch to its first stroke position) to the digital camera 200-2 as a communication slave function side using the aforementioned SOF packet.

Step S902, Step S903:

Upon detection of the SOF packet sent from the digital camera 200-1 (step S902), the digital camera 200-2 makes the image sensing condition setup according to that SOF packet (step S903).

Upon setting the image sensing conditions, whether or not the digital camera 200-1 as the communication master function side and the digital camera 200-2 as the communication slave function side have different image sensing setups is determined according to user's designations. For example, the communication slave function side may ignore the image sensing conditions on the communication master function side, and may sense an image under unique image sensing conditions, on the basis of an image sensing mode or the like.

Step S804, Step S805:

Upon detection of shutter release (shutter operation) by the user or using a self timer (step S804), for example, upon detection of depression of the shutter switch to its second stroke position (if the shutter switch has two stroke positions), the digital camera 200-1 detects the number of a frame which is output at that time (step S805).

Step S806:

The digital camera 200-1 determines a delay time on the basis of the frame number detected in step S805, i.e., determines a predetermined frame number at which strobe light is to be actually emitted, and a predetermined delay time from reception of that frame number until actual emission (a frame number corresponding to actual image sensing time, and a delay value from that frame number), and sends that information to the digital camera 200-2.

Step S904:

The digital camera 200-2 sets the predetermined frame number and the predetermined delay time from reception of that frame number until actual emission, which are received from the digital camera 200.

Step S807:

The digital camera 200-1 checks based on the frame number detected in step S805 if the frame number set in step S806 has been reached. As a result of this checking process, if it is determined that the set frame number has been reached, the flow advances to step S808.

Step S905:

The digital camera 200-2 checks based on the frame number sent from the digital camera 200-1 if the frame number set in step S904 has been reached. As a result of this checking process, if it is determined that the set frame number has been reached, the flow advances to step S906.

That is, in steps S807 and S905, both the digital cameras 200-1 and 200-2 wait until the predetermined frame number is reached.

At this time, the subsequent processes are synchronously executed since both the digital cameras 200-1 and 200-2 monitor the frame number output from the digital camera 200-1 as one communication master function side.

Step S808, Step S906:

The digital cameras 200-1 and 200-2 respectively execute image sensing control such as start of the operation of their image sensing elements, control of their digital shutters, open/close of their mechanical shutters, and the like.

During this image sensing operation, for example, the digital cameras 200-1 and 200-2 respectively execute image sensing operations according to their internal timers and the like, since the image sensing operation requires very high time precision.

Even when the image sensing timings of the digital cameras 200-1 and 200-2 are to be strictly synchronized or are to be shifted on purpose, since the digital cameras 200-1 and 200-2 respectively monitor the frame number output from the digital camera 200-1 as the communication master function side, and operate based on the frame number, they can cooperate at the accurate timing.

Step S809, Step S907:

The digital cameras 200-1 and 200-2 respectively check if their image sensing operations are complete. As a result of checking, if the image sensing operations are complete, the flow advances to step S810 or step S908.

Step S908:

If the digital camera 200-2 detects completion of the image sensing operation in step S907, and actually completes the image sensing operation, it sends a message indicating completion of the image sensing operation to the digital camera 200-1.

Step S810, Step S811:

The digital camera 200-1 sets a time-out time as in the second embodiment, and waits for the image sensing completion message sent from the digital camera 200-2 during that time. Upon reception of the message, or if a time out is reached although the message is not received, the flow advances to step S812.

In this manner, in the digital camera 200-1, subsequent processes can be prevented from being suspended by, e.g., a communication error or the like.

Step S812:

Upon completion of the image sensing operation, the flow returns to step S802, and the digital camera 200-1 waits for a setup that pertains to the next image sensing operation.

Step S909:

Upon completion of the image sensing operation, the flow returns to step S902, and the digital camera 200-2 waits for a setup that pertains to the next image sensing operation.

Note that this embodiment has exemplified the synchronous image sensing operations of a plurality of digital cameras. For example, synchronization of an external strobe emission device on the network can be implemented by executing the process shown in FIG. 7 parallel to the aforementioned process. Also, synchronization of two or more digital cameras as the communication slave function side can be implemented by setting unique addresses in these digital cameras.

As described above, according to the second and third embodiments, even when a plurality of digital cameras or strobe emission devices are connected to a network such as a USB network, the timing control of respective devices can be implemented using the same cable as that of the network that exchanges information. This is because the digital camera that autonomously makes an image sensing operation serves as a communication master function side which performs timing management of the network. When a given device has both the communication master and slave functions, that device can cope with both autonomous and passive operations in an image sensing operation by switching the communication master and slave functions, i.e., by switching the role in the network.

In the second and third embodiments, a network complying with the USB standard is used as that for connecting devices. However, the present invention is not limited to such specific network, but can be applied to any other networks as long as a communication master function that controls communication timings and a slave function can be selectively switched.

The USB cable connections form a tree pattern. However, the present invention is not limited to such specific pattern as long as a network allows other connection methods. That is, when a digital camera which serves as the communication slave function side so far is to be switched to the autonomous operation side of the image sensing operation after cables are connected, negotiation may be made via a communication to switch that digital camera to the communication master function side, thus switching the master/slave relationship of the image sensing operation.

Furthermore, even when a network that complies with a standard other than USB is used, if a network has a function of broadcasting information to a plurality of devices, the aforementioned technique can be applied by setting a digital camera that transmits broadcast data as the communication master function side.

Another Embodiment

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a flexible disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image sensing system comprising:
   an image sensing device for sensing an image; and
   a data transfer device for receiving data including speedlight data and image data from the image sensing device, selectively transmitting the speedlight data to at least one speedlight device, and selectively transmitting the image data to an external device;
   wherein the image sensing device includes:
   a determination unit for determining whether or not an image sensing instruction is received while the image data is transmitted; and
   a control unit for stopping a transmission of the image data and starting a transmission of the speedlight data, when the determination unit determines that the image sensing instruction is received while the image data is transmitted.

2. The system according to claim 1, wherein said image sensing device transmits the speedlight data and the image data to the data transfer device via a single line.

3. The system according to claim 1, wherein said data transfer device supplies electric power to the speedliqht.

4. The system according to claim 1, wherein said control unit temporally stops the transmission of the image data, holds a record indicating an interrupted position of the image data, and restarts the transmission of the image data from the held position after the transmission of the speedlight data.

5. The control method of an image sensing device for sensing an image and transmitting speedlight data and image data to a data transfer device which receives the speedlight data and image data from the image sensing device, selectively transmits the speedlight data for controlling the at least one speedlight device to a speedlight device, and selectively transmits the image data to an external device, the control method comprising steps of:

determining whether or not an image sensing instruction is received while the image data is transmitted; and stopping a transmission of the image data and starting a transmission of the speedlight data, when it is determined that the image sensing instruction is received while the image data is transmitted.

6. A computer-readable storage medium storing a computer program code for making a computer implement a function of a control method of claim 5.

* * * * *

UNITED STATES PATENT AND TRADEMARK OFFICE
CERTIFICATE OF CORRECTION

| | | |
|---|---|---|
| PATENT NO. | : 7,336,313 B2 | Page 1 of 1 |
| APPLICATION NO. | : 10/357849 | |
| DATED | : February 26, 2008 | |
| INVENTOR(S) | : Gaku Watanabe and Masayoshi Sekine | |

It is certified that error appears in the above-identified patent and that said Letters Patent is hereby corrected as shown below:

Column 20, claim 3, line 2, "speedliqth" should read --speedlight--.

Signed and Sealed this

Tenth Day of June, 2008

JON W. DUDAS
*Director of the United States Patent and Trademark Office*